US008755440B2

(12) United States Patent
Chen et al.

(10) Patent No.: US 8,755,440 B2
(45) Date of Patent: Jun. 17, 2014

(54) INTERPOLATION TECHNIQUES IN WAVELET TRANSFORM MULTIMEDIA CODING

(75) Inventors: Peisong Chen, San Diego, CA (US); Vijayalakshmi R. Raveendran, San Diego, CA (US); Fang Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1556 days.

(21) Appl. No.: 11/505,789

(22) Filed: Aug. 16, 2006

(65) Prior Publication Data

US 2007/0201755 A1    Aug. 30, 2007

Related U.S. Application Data

(60) Provisional application No. 60/721,436, filed on Sep. 27, 2005.

(51) Int. Cl.
| *H04N 7/12* | (2006.01) |
| *H04N 11/02* | (2006.01) |
| *H04N 11/04* | (2006.01) |
| *H04N 7/26* | (2006.01) |
| *H04N 7/50* | (2006.01) |
| *H04N 7/30* | (2006.01) |

(52) U.S. Cl.
CPC ..... *H04N 7/26585* (2013.01); *H04N 19/00781* (2013.01); *H04N 7/26425* (2013.01); *H04N 19/00824* (2013.01); *H04N 19/00333* (2013.01)
USPC ............. 375/240.18; 375/240.19; 348/395.1; 348/431.1

(58) Field of Classification Search
CPC .................. H04N 7/26425; H04N 19/00824; H04N 7/26585; H04N 19/00333; H04N 19/00781; H04N 7/0157; H04N 7/467; H04N 19/00503; H04N 19/00751
USPC ........... 375/240.18–240.19; 348/395.1–431.1
See application file for complete search history.

(56) References Cited

U.S. PATENT DOCUMENTS

| 4,383,272 A | * | 5/1983 | Netravali et al. ........... 348/416.1 |
| 6,377,621 B2 | * | 4/2002 | Borer ............................. 375/240 |

(Continued)

FOREIGN PATENT DOCUMENTS

| KR | 1020040106418 | 12/2004 |
| KR | 20050029219 A | 3/2005 |

(Continued)

OTHER PUBLICATIONS

Ohm, Jens-Rainer, "Advances in Scalable Video Coding," Proceedings of the IEEE, IEEE. New York, US, vol. 93 No. 1, Jan. 2005, pp. 42-56.

(Continued)

*Primary Examiner* — Sath V Perungavoor
*Assistant Examiner* — Xiaolan Xu
(74) *Attorney, Agent, or Firm* — Arent Fox LLP (57) ABSTRACT

This disclosure describes frame interpolation techniques within a wavelet transform coding scheme. The frame interpolation may be used to generate one or more interpolated frames between two successive low frequency frames coded according to the wavelet transform coding scheme. Such interpolation may be useful to increase the frame rate of a multimedia sequence that is coded via wavelet transforms. Also, the techniques may be used to interpolate lost frames, e.g., which may be lost during wireless transmission.

17 Claims, 6 Drawing Sheets

(56) References Cited

U.S. PATENT DOCUMENTS

| | | | |
|---|---|---|---|
| 6,532,256 B2* | 3/2003 | Miller | 375/222 |
| 6,738,523 B1* | 5/2004 | Small et al. | 382/240 |
| 6,853,682 B2* | 2/2005 | Min | 375/240.19 |
| 6,944,225 B2* | 9/2005 | Li | 375/240.19 |
| 7,031,535 B2* | 4/2006 | Yamamoto | 382/240 |
| 7,321,625 B2* | 1/2008 | Zhang et al. | 375/240.11 |
| 2003/0202599 A1* | 10/2003 | Turaga et al. | 375/240.19 |
| 2004/0190602 A1 | 9/2004 | Lomp | |
| 2005/0047503 A1* | 3/2005 | Han et al. | 375/240.01 |
| 2005/0226335 A1* | 10/2005 | Lee et al. | 375/240.16 |
| 2006/0008000 A1* | 1/2006 | Ye et al. | 375/240 |
| 2006/0146937 A1* | 7/2006 | Ye et al. | 375/240.19 |
| 2006/0171462 A1* | 8/2006 | Barrau | 375/240.13 |
| 2006/0239345 A1* | 10/2006 | Taubman et al. | 375/240.03 |

FOREIGN PATENT DOCUMENTS

| | | |
|---|---|---|
| KR | 20050042494 A | 5/2005 |
| KR | 20050052532 A | 6/2005 |
| WO | 03094524 | 11/2003 |
| WO | WO03091524 A1 | 11/2003 |

OTHER PUBLICATIONS

Ho, H.K. et al., "Efficient Wavelet-based Temporally Scalable Video Coding," IEEE Signal Processing, vol. 1, Aug. 23, 2002-Aug. 30, 2002, pp. 881-884.

Csillag, Peter et al., "Enhancement of Video Data Using Motion-Compensated Postprocessing Techniques," Acoustics, Speech, and Signal Processing, 1997. ICASSP-97, 1997 IEEE International Conference on Munich, Germany, Los Alamitos, CA, USA, IEEE Comput. Soc, US, vol. 4, Apr. 21, 1997, pp. 2897-2900.

Domanski, Marek et al., "Spatio-Temporal Scalability for MPEG Video Coding," IEEE Transactions on Circuits and Systems for Video Technology DOI, vol. 10 No. 7, Oct. 2000, pp. 1088-1093.

Choi, Byung-Tae et al., "Frame Rate Up-Conversion Using the Wavelet Transform," IEEE Consumer Electronics, 2000 ICCE Digest of Technical Papers, Los Angeles, CA, Jun. 13, 2000-Jun. 15, 200, pp. 172-173.

Turaga, Deepak et al., "Unconstrained Motion Compensated Temporal Filtering," ISO/IE JTC1/SC29/WG11, May 2002, pp. 1-15.

PCT Search Report, Apr. 27, 2007.

Written Opinion—PCT/US2006/037990, International Search Authority, European Patent Office, Apr. 27, 2007.

* cited by examiner

INTERPOLATION TECHNIQUES IN WAVELET TRANSFORM MULTIMEDIA CODING

CLAIM OF PRIORITY UNDER 35 U.S.C. §119

The present Application for Patent claims priority to Provisional Application No. 60/721,436, filed Sep. 27, 2005, and assigned to the assignee hereof and hereby expressly incorporated by reference herein.

TECHNICAL FIELD

The disclosure relates to multimedia encoding and decoding and, more particularly, decoding techniques for wavelet transform coding schemes.

BACKGROUND

A number of different multimedia coding techniques and standards have been established for coding digital multimedia sequences. Many current techniques make use of block-based coding. In block-based coding, frames of a multimedia sequence are divided into discrete blocks of data, and the blocks are coded based on the differences with other blocks.

Motion-based block coding techniques make use of motion vectors to code the blocks of multimedia frames based on motion relative to pixels within blocks of other frames in the multimedia sequence. The motion vectors identify blocks of different frames that were used to code the current multimedia block. By using such motion vectors, the information needed to convey multimedia sequences can be reduced by sending difference information indicative of the differences between the current block being coded and the predictive block identified by the motion vector.

Some spatial-based coding techniques also rely on block coding techniques. In particular, spatial-based coding may use blocks within a given frame to predict a respective block being coded. In addition, discrete cosine transform (DCT) techniques typically operate on blocks of pixels. DCT techniques are often used for image and video compression, and may be used alone or in conjunction with other block-based coding techniques.

Wavelet transform coding is one viable alternative to block-based coding techniques, such as DCT techniques. Wavelet transform coding is sometimes referred to as Discrete Wavelet Transform (DWT). Video or image multimedia compression using wavelet transform coding can eliminate blockiness artifacts (sometimes referred to as tiling), which are commonly exhibited with DCT coding. Moreover, wavelet-based multimedia compression often outperforms block-based DCT compression, particularly when evaluated using the Peak Signal to Noise Ratio (PSNR) or Mean Squared Error (MSE) metrics. Furthermore, the subjective quality of multimedia frames or images compressed with wavelet-based coding may appear better than block DCT methods for the same compression ratio.

SUMMARY

This disclosure describes frame interpolation techniques within a wavelet transform coding scheme. The frame interpolation techniques may be used to generate one or more interpolated frames between two successive frames or two successive low frequency frames coded according to the wavelet transform coding scheme. Such interpolation may be useful to increase the effective frame rate of a multimedia sequence that is coded via wavelet transforms, providing so-called frame rate up-conversion (FRUC). Also, the techniques may be used to interpolate lost frames, e.g., which may be lost during wireless transmission.

The techniques of this disclosure may be very useful in interpolating frames that would otherwise be lost when one or more of the high frequency components are lost during transmission. If multi-level wavelet transform coding is used, for example, several original frames may be represented as one low frequency component, several high frequency components, and motion fields. The low frequency component may be coded with more bits than the high frequency components, and may be transmitted with higher power to ensure reception. The high frequency components may be coded or transmitted with fewer assurances, since interpolation of lost frames can be used in the event such high frequency components are lost or corrupted during the transmission.

In some embodiments, this disclosure provides a method comprising receiving wavelet information associated with encoded frames of a multimedia sequence, decoding the encoded frames of the multimedia sequence, and interpolating one or more additional frames between the decoded frames based on the wavelet information.

In some embodiments, this disclosure provides an apparatus comprising a receiver that receives wavelet information associated with encoded frames of a multimedia sequence, and a decoder that decodes the encoded frames of the multimedia sequence and interpolates one or more additional frames between the decoded frames based on the wavelet information.

In some embodiments, this disclosure provides a processor configured to decode frames of the multimedia sequence, the frames being encoded via wavelet information according to a wavelet transform coding scheme, and interpolate one or more additional frames between the decoded frames based on the wavelet information.

In some embodiments, this disclosure provides an apparatus comprising means for receiving wavelet information associated with encoded frames of a multimedia sequence, means for decoding the encoded frames of the multimedia sequence, and means for interpolating one or more additional frames between the decoded frames based on the wavelet information.

The techniques described herein may be implemented in hardware, software, firmware, or any combination thereof. If implemented in software, the software may be executed in a digital signal processor (DSP) or other type of processor. The software that executes the techniques may be initially stored in a machine-readable medium, such as a computer-readable medium, and loaded and executed in the processor or other machine to allow for video encoding or decoding of transitional effects as described herein.

Accordingly, this disclosure also contemplates a machine-readable medium comprising instructions that upon execution cause a machine to receive wavelet information associated with encoded frames of a multimedia sequence, decode the encoded frames of the multimedia sequence, and interpolate one or more additional frames between the decoded frames based on the wavelet information.

The details of one or more embodiments are set forth in the accompanying drawings and the description below. Other features, objects, and advantages will be apparent from the description and drawings, and from the claims.

DETAILED DESCRIPTION

This disclosure describes frame interpolation techniques within a wavelet transform coding scheme. Wavelet transform coding is an alternative to block-based coding techniques such as discrete cosine transform (DCT) techniques, and often outperforms block-based DCT compression. Wavelet-based coding involves combining successive frames of a multimedia sequence to generate low frequency and high frequency wavelet components (sometimes called "sub-band frames"). The low frequency component and high frequency component are examples of low frequency and high frequency wavelet information that can be used to code multimedia frames according to a wavelet transform coding scheme.

In particular, the low frequency wavelet information is a coarse or low temporal resolution version of the frames being coded, and is typically represented as the average pixel values of the two frames being coded. The high frequency wavelet information provides added detail of the frames being coded, and is typically represented as the difference between the pixels of the frames being coded. Wavelet-based coding information for two successive frames includes the low frequency wavelet information, the high frequency wavelet information and a motion field indicative of motion between the pixels of the two successive frames.

Often, the wavelet transform coding process is repeated on multiple levels, and applied with respect to two successive low frequency sub-band frames at each respective level of the coding process. If multi-level wavelet transform coding is used, for example, several original frames may be represented as one low frequency component, several high frequency components, and motion fields.

According to this disclosure, frame interpolation is used during a wavelet-based decoding process in order to generate one or more additional interpolated frames between two successive frames or two successive low frequency frames. The interpolation may be useful to increase the effective frame rate of a multimedia sequence that is coded via wavelet transforms, supporting so-called frame rate up-conversion (FRUC). Also, the techniques may be used to interpolate lost frames, e.g., which may be lost during wireless transmission. Again, when multi-level wavelet transform coding is used, several original frames may be represented as one low frequency component, several high frequency components and motion fields. In this case, the techniques of this disclosure may be very useful in interpolating frames that would otherwise be lost when one or more of the high frequency components are lost during transmission.

Figure 1:
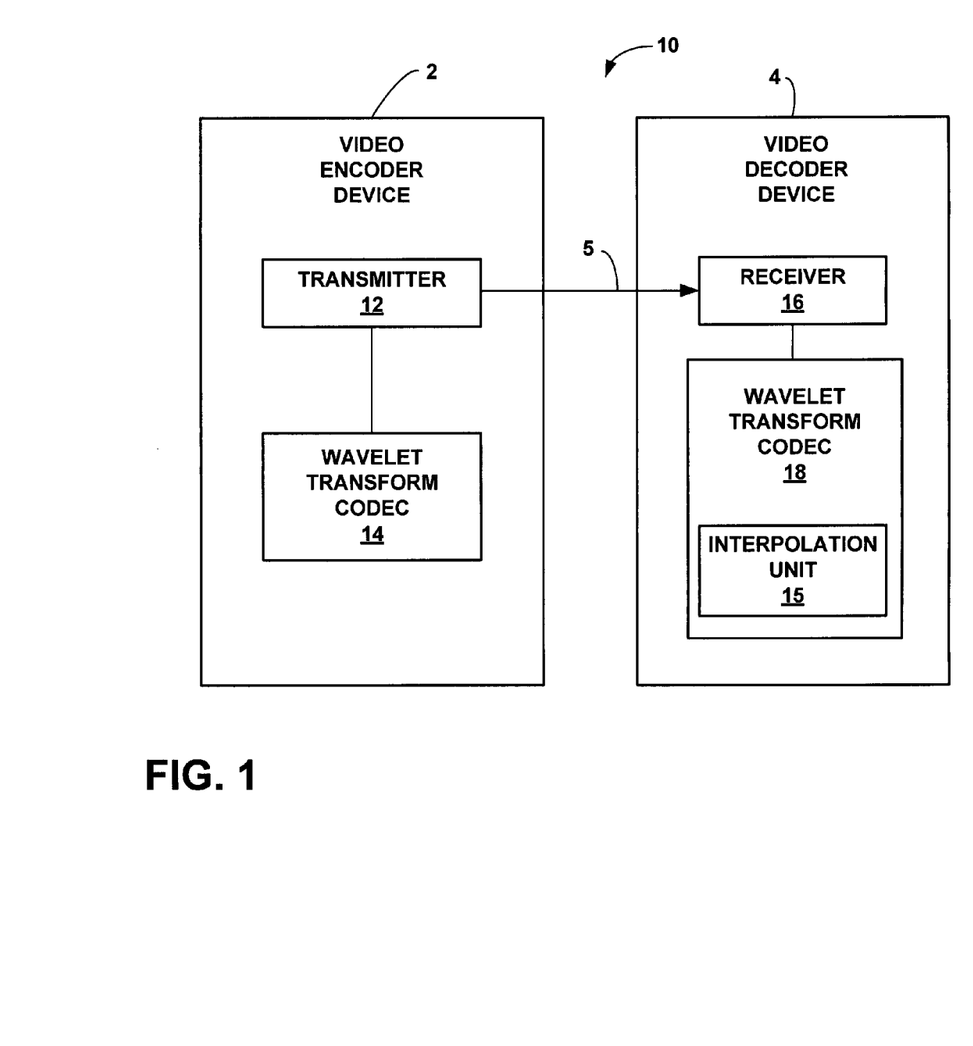
FIG. 1 is a block diagram illustrating a video encoding and decoding system that may implement wavelet transform coding techniques in accordance with this disclosure.

FIG. 1 is a block diagram illustrating a video encoding and decoding system 10 that may implement wavelet transform coding techniques in accordance with this disclosure. As shown, system 10 includes a video encoder device 2 and a video decoder device 4. Encoded multimedia sequences may be transmitted from video encoder device 2 to video decoder device 4 over a communication channel 5. To this end, video encoder device 2 and video decoder device 4 include a transmitter 12 and a receiver 16, respectively, to facilitate such communication, which may be wired or wireless communication.

Video encoder device 2, for example, may form part of a broadcast network device used to broadcast one or more channels of video to wireless subscriber devices. In this case, video encoder device 2 may transmit the encoded data to several video decoder devices (i.e., many subscribers of the broadcast service). A single video decoder device 4, however, is illustrated in FIG. 1 for simplicity. Video encoder device 2 and video decoder device 4 may be implemented as one or more processors, digital signal processors, application specific integrated circuits (ASICs), field programmable gate arrays (FPGAs), discrete logic, software, hardware, firmware, or any combinations thereof.

Examples of video encoder device 2 may include wireless base stations or any infrastructure node used to broadcast the encoded video data. Video decoder device 4, on the other hand, may comprise a user-device that receives the encoded video. By way of example, video decoder device 4 may be implemented as part of a digital television, a wireless communication device, a portable digital assistant (PDA), a laptop computer or desktop computer, a digital music and video device, such as those sold under the trademark "iPod," or a radiotelephone such as cellular, satellite or terrestrial-based radiotelephone. In other examples, both video encoder device 2 and video decoder device 4 may comprise user devices, which communicate video data between such devices via video telephony, or the like.

The illustrated components in system 10 are exemplary of those applicable to implementation of the techniques described herein, although encoder device 2 and decoder device 4 may include many other components, if desired. Moreover, the techniques of this disclosure are not necessarily limited to use in a system like that of system 10, nor a broadcast system. The techniques may find application in any video coding environment in which wavelet transformation coding techniques are used to code a multimedia sequence.

As shown in FIG. 1, video encoder device 2 includes a wavelet transform CODEC 14, which performs wavelet transform coding of a multimedia sequence. The multimedia sequence may be originally stored in a memory location, which is not illustrated in FIG. 1 for simplicity. Such memory may be part of video encoder device 2 or may be an external memory that provides multimedia sequences to video encoder device 2. The multimedia sequence being coded by wavelet transform CODEC 14 may comprise a live real-time video or video and audio sequence to be coded and transmitted as a broadcast, or may comprise a pre-recorded and stored video or video and audio sequence to be coded and transmitted as a broadcast or on-demand.

Wavelet transform CODEC 14 may implement one or more levels of wavelet transform coding on frames of a multimedia sequence. In particular, wavelet transform CODEC 14 combines successive frames of a multimedia sequence to generate low frequency and high frequency components (sub-band frames). The low frequency component (low frequency sub-band frame) is a coarse or low temporal resolution version of the frames being coded, and is typically represented as the average pixel values of two successive frames being coded. The high frequency component (high frequency sub-band frame) provides added detail of the frames being coded, and is typically represented as the difference between the pixels of the two successive frames being coded. Wavelet transform CODEC 14 generates a low frequency component, a high frequency component and a motion field indicative of motion between the pixels of the two successive frames. Also, in some cases, wavelet transform CODEC 14 repeats the wavelet coding process on multiple levels, and applies the process with respect to two successive low frequency sub-band frames at each respective level of the coding process. If multi-level wavelet transform coding is used, for example, several original frames may be represented as one low frequency component, several high frequency components, and motion fields.

Wavelet transform CODEC 14 may code the low frequency component with more bits than the high frequency components. Also, transmitter 12 may transmit the low frequency component with more power than the high frequency components over channel 5. The techniques of this disclosure may be very useful in interpolating frames that would otherwise be lost when one or more of the high frequency components are lost during such transmission. The techniques of this disclosure may also be very useful in interpolating frames between the original frames to get multimedia output at a decoder with a higher frame rate than the original multimedia sequence at the encoder.

Receiver 16 of video decoder device 4 receives the wavelet information that codes frames of the multimedia sequence according to the wavelet transform coding scheme. Wavelet transform CODEC 18 then decodes the frames of the multimedia sequence based on the wavelet information. In particular, wavelet transform CODEC 18 decodes the frames to reconstruct the original frames that were coded by wavelet transform CODEC 14. In accordance with this disclosure, wavelet transform CODEC 18 includes an interpolation unit 15. During the decoding process interpolation unit 15 interpolates one or more additional frames between the decoded frames or the decoded low frequency frames based on the wavelet information. Additional details of this decoding and interpolation process are provided below.

Figure 2:
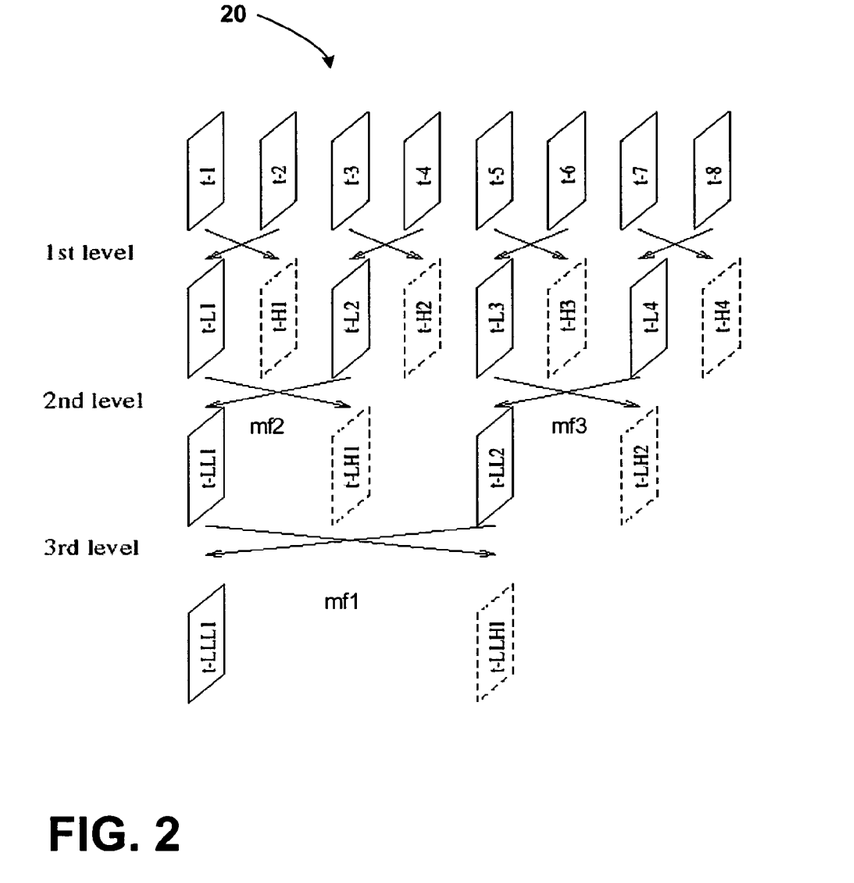
FIG. 2 is a conceptual diagram illustrating concepts of wavelet transform coding.

FIG. 2 is a conceptual diagram illustrating concepts of wavelet transform coding. Such wavelet based coding may be executed by wavelet transform CODEC 14 on the encoding side and by wavelet based transform CODEC 18 on the decoding side. More specifically, FIG. 2 illustrates three-stage motion compensated temporal filtering (MCTF) 20, which generates an octave based four-band decomposition. The process may use Haar filters or the like, as are common in wavelet-based coding.

The notation of FIG. 2 is as follows. Frames t-1, t-2, t-3, t-4, t-5, t-6, t-7 an represent temporally adjacent frames of a video sequence being coded. The motion fields are not shown in FIG. 2 for the motion between frames at this first level of decomposition. Frames t-L1 and t-H1 represent the low frequency component and high frequency component associated with the wavelet based coding of frames t-1 and t-2. Frames t-L2 and t-H2 represent the low frequency component and high frequency component associated with the wavelet based coding of frames t-3 and t-4. Frames t-L3 and t-H3 represent the low frequency component and high frequency component associated with the wavelet based coding of frames t-5 and t-6. Frames t-L4 and t-H4 represent the low frequency component and high frequency component associated with the wavelet based coding of frames t-7 and t-8.

At the second level of coding, frames t-LL1 and t-LH1 represent the low frequency component and high frequency component associated with the wavelet based coding of sub-band frames t-L1 and t-L2. The label "mf2" refers to the motion field between frames t-L1 and t-L2. Frames t-LL2 and t-LH2 represent the low frequency component and high frequency component associated with the wavelet based coding of sub-band frames t-L3 and t-L4. The label "mf3" refers to the motion field between frames t-L3 and t-L4.

At the third level of coding frames t-LLL1 and t-LLH1 represent the low frequency component and high frequency component associated with the wavelet based coding of sub-band frames t-LL1 and t-LL2. The label "mf1" refers to the motion field between frames t-LL1 and t-LL2.

In the three-stage MCTF 20 shown in FIG. 2, eight temporal sub-band frames are generated and transmitted in the coding process of frames t-1 to t-8: one t-LLL frame, one t-LLH frame, two t-LH frames, and four t-H frames. There are seven motion fields: motion field mf1 between t-LL1 and t-LL2, motion field mf2 between t-L1 and t-L2, motion field mf3 between t-L3 and t-L4 and four other motion fields at the first level decomposition (which are not labeled for simplicity). Thus, to code frames t-1 to t-8 with three stages of wavelet coding, the wavelet information includes one low frequency component and seven different high frequency components.

At each level, for every two successive frames or two successive low frequency frames, Haar filtering may be performed as follows:

$$L[m-d_m, n-d_n] = \frac{1}{\sqrt{2}} B[m,n] + \frac{1}{\sqrt{2}} A[m-d_m, n-d_n]$$

$$H[m,n] = \frac{1}{\sqrt{2}} B[m,n] - \frac{1}{\sqrt{2}} A[m-d_m, n-d_n],$$

where $L[m, n]$ and $H[m, n]$ are the temporal low and high frequency frames, $A[m, n]$ and $B[m, n]$ are the first and second frames, and $(d_m, d_n)$ is the motion vector.

The decomposition is a top-down procedure in the encoding process, while the reconstruction is a bottom-up procedure in the decoding process.

$$A[m-d_m, n-d_n] = \frac{1}{\sqrt{2}} L[m-d_m, n-d_n] - \frac{1}{\sqrt{2}} H[m,n],$$

$$B[m,n] = \frac{1}{\sqrt{2}} L[m-d_m, n-d_n] + \frac{1}{\sqrt{2}} H[m,n].$$

Motion information plays an essential role in the MCTF. Temporal filtering is performed along the motion trajectories. The motion information used by the encoder during MCTF is needed at the decoder.

Interpolation according to this disclosure exploits redundancy across motion fields at different levels. For example, mf1 also contains information of mf2. This kind of redundancy provides a good scenario for encoder assisted frame rate up conversion (EA-FRUC). In particular, at lease one motion field can be derived from the other motion field using such interpolation techniques.

Figure 3:
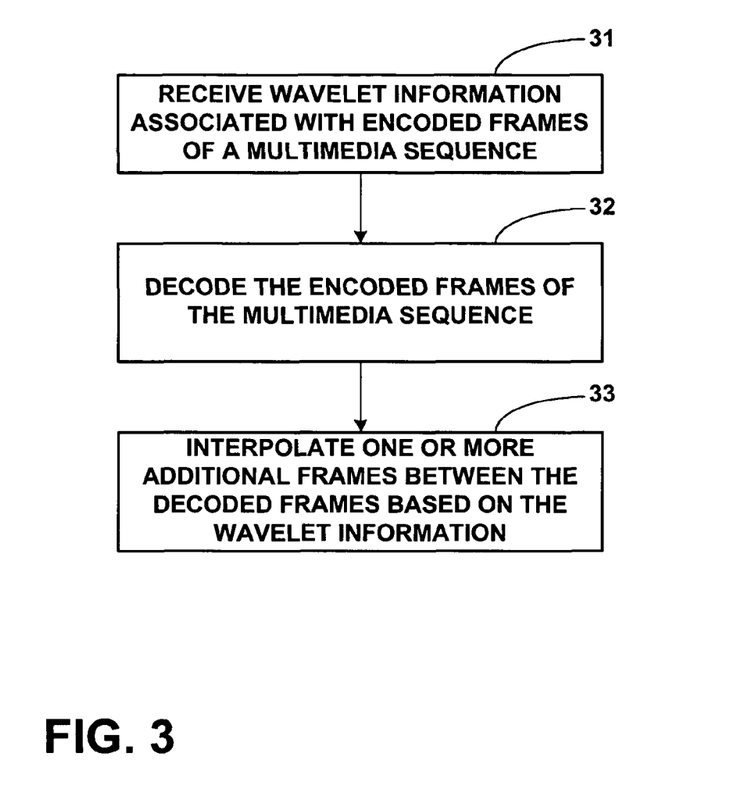
FIG. 3 is a flow diagram illustrating a wavelet transform decoding technique according to this disclosure.

FIG. 3 is a flow diagram illustrating a wavelet transform decoding technique according to this disclosure. As shown in FIG. 3, receiver 16 receives wavelet information associated with encoded frames of a multimedia sequence (31). The wavelet information, for example, may be information that codes the frames of the multimedia sequence, and may include low frequency wavelet information, high frequency wavelet information and motion information. The low frequency wavelet information may comprise one or more low frequency sub-band frames, as described above, and may be sent using more bits and higher energy than the high frequency wavelet information to ensure transmission of the low frequency wavelet information.

The high frequency wavelet information may also comprise sub-band frames, i.e., one or more high frequency sub-band frames. The high frequency wavelet information may be sent with fewer bits and/or lower energy than the low frequency wavelet information, as the high frequency information is less essential, and interpolation can address one or more missing high frequency sub-band frames. The motion information may comprise motion fields indicative of motion between two successive low frequency frames and/or sub-band frames.

Once the wavelet information is received (31), wavelet transform CODEC 18 decodes the encoded frames of the multimedia sequence (32). In particular, (referring to FIG. 2), receiver 16 may receive t-LLL1, t-H1, t-LH1, t-H2, t-LLH1, t-H3, t-LH2, t-H4 and the motion fields. Wavelet transform CODEC 18 may generate t-LL1 and t-LL2 based on t-LLL1 and t-LLH1, generate t-L1 and t-L2 based on t-LL1 and t-LH1, and generate t-L3 and t-L4 based on t-LL2 and t-LH2. Wavelet transform CODEC 18 may also generate t-1 and t-2 based on t-L1 and t-H1, generate t-3 and t-4 based on t-L2 and t-H2, generate t-5 and t-6 based on t-L3 and t-H3, and generate t-7 and t-8 based on t-L4 and t-H4.

Next, interpolation unit 15 of wavelet transform CODEC 18 interpolates one or more additional frames between the decoded frames based on the wavelet information (33). This interpolation may be performed to generate one or more missing frames, or to introduce additional frames to increase the effective frame rate in the decoded multimedia sequence. For example, if none of t-H1, t-LH1 or t-H2 were received, interpolation between t-LL1 and t-LL2 could be used to reconstruct t-2, t-3 and t-4. Alternatively, interpolation could be used to generate additional frames e.g., between t-1 and t-2, between t-2 and t-3, between t-3 and t-4, and so forth.

In general, interpolation unit 15 may interpolate one or more low frequency frames based on two decoded low frequency frames and motion trajectories representing motion between the two decoded low frequency frames. In some cases, one or more additional frames are interpolated between two temporally adjacent decoded frames. Any number of frames may be interpolated in this manner. In the interpolation process, pixel values for the one or more additional frames are generated based on motion trajectories between pixels of two temporally adjacent decoded frames. The motion information embodied in the motion fields provides the motion trajectories between the pixels of two temporally adjacent decoded frames. The motion trajectories are typically linear between the two temporally adjacent decoded frames, although this disclosure is not necessarily limited to linear interpolation and could extend to non-linear interpolation as well.

The interpolation may occur with respect to every pixel of the interpolated frames based on the decoded pixels of the temporally adjacent decoded frames. In other words, interpolating may include interpolating every pixel of the one or more additional frames based on decoded pixels of two temporally adjacent decoded frames and motion trajectories between the decoded pixels of the two temporally adjacent decoded frames.

Figure 4:
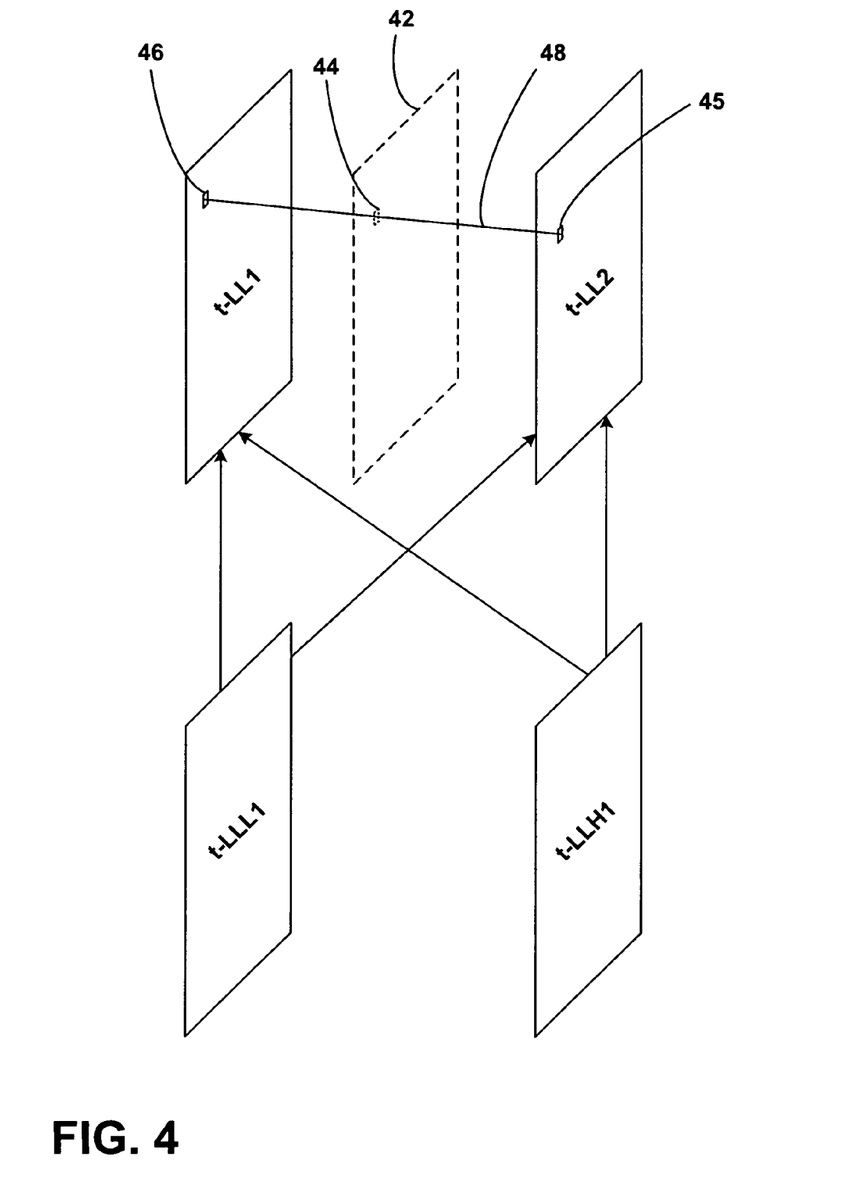
FIG. 4 is a conceptual diagram illustrating interpolation of one frame between two low frequency frames during a wavelet transform decoding process.

FIG. 4 is a conceptual diagram illustrating wavelet transform decoding including interpolation of one frame between two low frequency frames. In this example, the low frequency frames are t-LL1 and t-LL2, which can be generated from t-LLL1 and t-LLH1, as illustrated. The motion information embodied in motion field "mf1" is used to define a linear motion trajectory 48 between pixel 45 of frame t-LL2 and corresponding pixel 46 of frame t-LL1. In this case, interpolation of that respective pixel for interpolated frame 42 is pixel 44 along motion trajectory 48. For simplicity, FIG. 4 shows the interpolation of one pixel (pixel 44) of frame 42. In practice, however, every pixel of frame 42 could be interpolated in a similar manner based on the corresponding pixels in decoded frames t-LL1 and t-LL2 and the motion trajectory between such frames.

Figure 5:
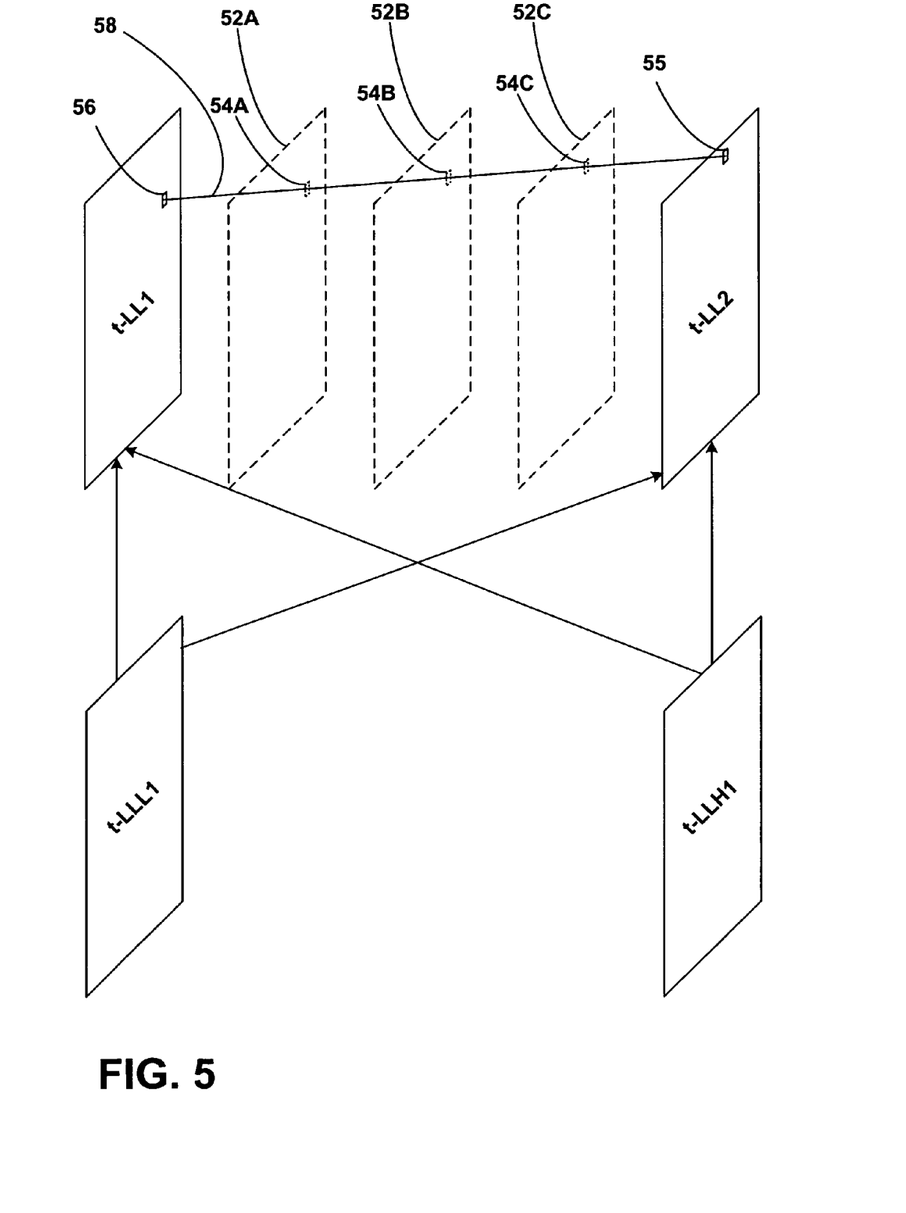
FIG. 5 is a conceptual diagram illustrating interpolation of three frames between two low frequency frames during a wavelet transform decoding process.

In some cases, several frames may be interpolated along the motion trajectories between the decoded frames, i.e., two or more frames. FIG. 5 is a conceptual diagram illustrating wavelet transform decoding including interpolation of three frames between two low frequency frames. Additional frames could also be interpolated, if desired.

In the example of FIG. 5, the low frequency frames are t-LL1 and t-LL2 are illustrated, which are generated from t-LLL1 and t-LLH1. The motion information embodied in motion field "mf1" is used to define a linear motion trajectory 58 between pixel 55 of frame t-LL2 and corresponding pixel 56 of frame t-LL1. In this case, interpolation of that respective pixel for interpolated frames 52A, 52B and 52C results in interpolated pixels 54A, 54B and 54C respectively, all of which fall along motion trajectory 58. Like FIG. 4, FIG. 5 only shows the interpolation of one pixel per frame (pixels 54A, 54B and 54C for frames 52A, 52B and 52C). Again, however, every pixel of frames 52A, 52B and 52C could be interpolated in a similar manner based on the corresponding pixels in decoded frames t-LL1 and t-LL2 and the motion trajectories defined by the different pixels between such frames.

Figure 6:
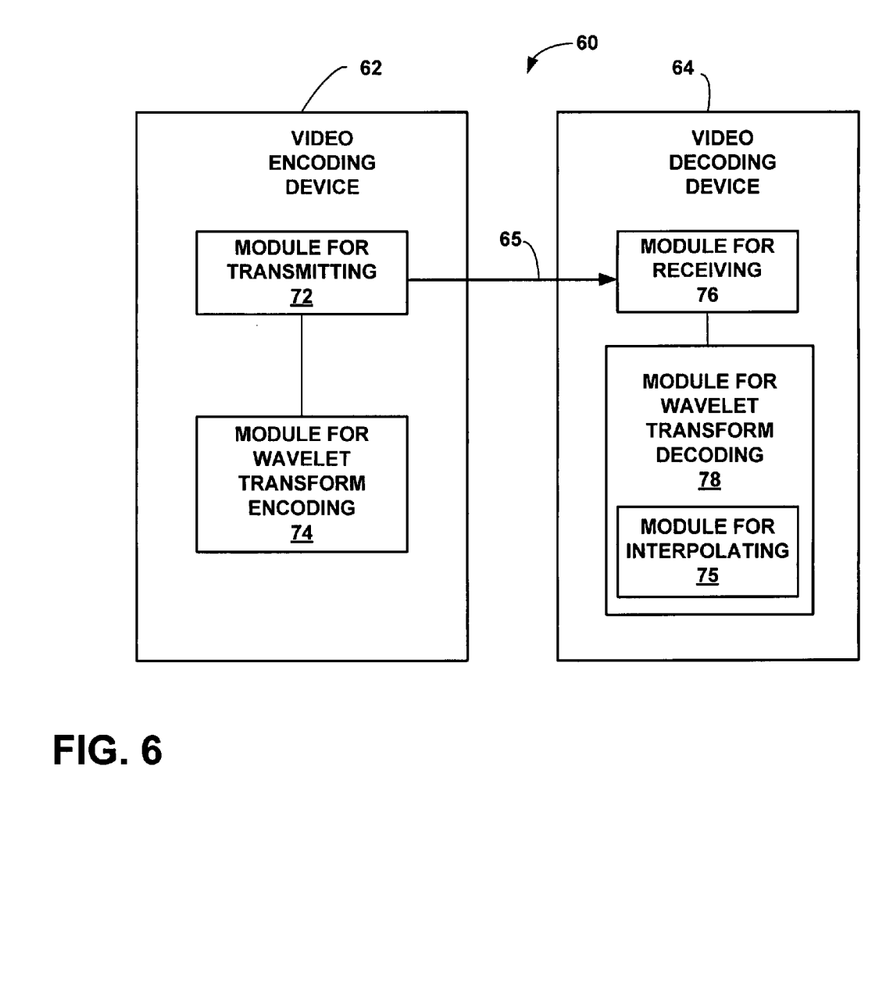
FIG. 6 is another block diagram illustrating a video encoding and decoding system that may implement wavelet transform coding techniques in accordance with this disclosure.

FIG. 6 is another block diagram illustrating a video encoding and decoding system that may implement wavelet transform coding techniques in accordance with this disclosure. As shown in FIG. 6, system 60 includes a video encoder device 62 and a video decoder device 64. Encoded multimedia sequences are transmitted from video encoder device 62 to video decoder device 64 over a communication channel 65, which may be wired or wireless.

Video encoder device 62 includes a module for wavelet transform encoding 74, which performs wavelet transform encoding of a multimedia sequence. In particular, module for wavelet transform encoding 74 may implement one or more levels of wavelet transform coding on frames of a multimedia sequence, e.g., by combining successive frames of a multimedia sequence to generate low frequency and high frequency components (sub-band frames), and motion fields indicative of motion between the pixels of successive frames. Moreover, module for wavelet transform encoding 74 may repeat the wavelet coding process on multiple levels, and apply the process with respect to two successive low frequency sub-band frames at each respective level of the coding process. Module for transmitting 72 transmits the coded wavelet information, e.g., one or more low frequency components, one or more high frequency components and one or more motion fields, to video decoding device 64. Module for wavelet transform encoding 74 may comprise an encoder that performs encoding according to a wavelet transform coding scheme. Module for transmitting 72 may comprise a transmitter that sends information or a transceiver that both sends and receives information.

Module for receiving 76 receives the wavelet information used to code frames of the multimedia sequence according to the wavelet transform coding scheme. Module for wavelet transform decoding 78 then decodes the frames of the multimedia sequence based on the wavelet information. In particular, module for wavelet transform decoding 78 decodes the frames to reconstruct the original frames that were coded by module for wavelet transform encoding 74. In accordance with this disclosure, module for wavelet transform decoding 78 includes a module for interpolation 75. Accordingly, during the decoding process, module for interpolation 75 interpolates one or more additional frames between the decoded frames based on the wavelet information. This interpolation may be to add additional frames to increase the frame rate in the decoded video or to interpolate one or more frames that may have been lost during the transmission of the wavelet information. Module for wavelet transform decoding 78 may comprise a decoder that performs decoding according to a wavelet transform coding scheme, yet implements interpolation techniques in this context via module for interpolation 75. Module for receiving 76 may comprise a receiver that receives information or a transceiver that both sends and receives information.

In accordance with this disclosure, means for transmitting may comprise a transmitter 12 (FIG. 1) or a module for transmitting 72 (FIG. 6). Similarly, means for receiving may comprise a receiver 16 (FIG. 1) or a module for receiving 76 (FIG. 6). Means for wavelet transform encoding may comprise a wavelet transform CODEC 14 (FIG. 1) or a module for transform encoding 74 (FIG. 6). Means for wavelet transform decoding may comprise a wavelet transform CODEC 18 (FIG. 1) or a module for transform decoding 78 (FIG. 6). Means for interpolating may comprise an interpolation unit 15 (FIG. 1) or a module for interpolating 75 (FIG. 6).

A number of embodiments have been described for interpolating frames in the context of wavelet transform coding. The techniques described herein may be implemented in hardware, software, firmware, or any combination thereof. If implemented in software, the techniques may be realized in part by a computer readable medium (or other machine-readable medium) comprising program code containing instructions that, when executed, performs one or more of the techniques described herein. In this case, the computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The instructions may be executed by one or more processors or other machines, such as one or more digital signal processors (DSPs), general purpose microprocessors, an application specific integrated circuits (ASICs), field programmable logic arrays (FPGAs), or other equivalent integrated or discrete logic circuitry. Generally, the machine that executes the instructions may comprise an apparatus. In some embodiments, the functionality described herein may be provided within dedicated software modules or hardware units configured for encoding and decoding, or incorporated in a combined video encoder-decoder (CODEC).

Nevertheless, various modifications may be made to the techniques described without departing from the scope of the following claims. Accordingly, the specific embodiments described above, and other embodiments are within the scope of the following claims.

The invention claimed is:

1. A method comprising:
    receiving wavelet information associated with encoded frames of a multimedia sequence;
    decoding the encoded frames of the multimedia sequence; and
    interpolating additional frames between the decoded frames based on the wavelet information;
    wherein the wavelet information comprises low frequency wavelet information, high frequency wavelet information and motion information,
    wherein the motion information comprises a plurality of motion fields, at least one of the motion fields being derived from another of the motion fields,
    wherein decoding the encoded frames comprises decoding a low frequency frame associated with the low frequency wavelet information and a high frequency frame associated with the high frequency wavelet information into two decoded low frequency frames, and
    wherein interpolating additional frames between the decoded frames comprises interpolating two or more low frequency frames based on the two decoded low frequency frames and linear motion trajectories representing motion between the two decoded low frequency frames.

2. The method of claim 1, wherein the wavelet information is used to code the encoded frames of the multimedia sequence according to a wavelet transform coding scheme.

3. The method of claim 1, wherein interpolating comprises defining pixel values for the additional frames based on motion trajectories between pixels of two temporally adjacent decoded frames.

4. The method of claim 3, wherein the motion trajectories are linear between the two temporally adjacent decoded frames.

5. The method of claim 1, wherein the low frequency wavelet information is coded at a different bit rate than the high frequency wavelet information.

6. The method of claim 1, wherein the low frequency wavelet information is transmitted at a different power level than the high frequency wavelet information.

7. The method of claim 1, wherein interpolating comprises interpolating every pixel of the additional frames based on decoded pixels of two temporally adjacent decoded frames and motion trajectories between the decoded pixels of the two temporally adjacent decoded frames.

8. An apparatus comprising:
    a receiver that receives wavelet information associated with encoded frames of a multimedia sequence; and
    a decoder that decodes the encoded frames of the multimedia sequence and interpolates additional frames between the decoded frames based on the wavelet information;
    wherein the wavelet information comprises low frequency wavelet information, high frequency wavelet information and motion information,
    wherein the motion information comprises a plurality of motion fields, at least one of the motion fields being derived from another of the motion fields,
    wherein the decoder decodes the encoded frames by decoding a low frequency frame associated with the low frequency wavelet information and a high frequency frame associated with the high frequency wavelet information into two decoded low frequency frames, and
    wherein the decoder interpolates two or more low frequency frames based on the two decoded low frequency frames and linear motion trajectories representing motion between the two decoded low frequency frames.

9. The apparatus of claim 8, wherein the wavelet information is used to code the encoded frames of the multimedia sequence according to a wavelet transform coding scheme.

10. The apparatus of claim 8, wherein the decoder interpolates the additional frames by defining pixel values for the additional frames based on motion trajectories between pixels of two temporally adjacent decoded frames.

11. The apparatus of claim 10, wherein the motion trajectories are linear between the two temporally adjacent decoded frames.

12. The apparatus of claim 8, wherein the low frequency wavelet information is coded at a different bit rate than the high frequency wavelet information.

13. The apparatus of claim 8, wherein the low frequency wavelet information is transmitted at a different power level than the high frequency wavelet information.

14. The apparatus of claim 8, wherein the decoder interpolates every pixel of the additional frames based on decoded pixels of two temporally adjacent decoded frames and motion trajectories between the decoded pixels of the two temporally adjacent decoded frames.

15. A non-transitory machine-readable medium comprising instructions that upon execution cause a machine to:
receive wavelet information associated with encoded frames of a multimedia sequence;
decode the encoded frames of the multimedia sequence; and
interpolate additional frames between the decoded frames based on the wavelet information;
wherein the wavelet information comprises low frequency wavelet information, high frequency wavelet information and motion information,
wherein the motion information comprises a plurality of motion fields, at least one of the motion fields being derived from another of the motion fields,
wherein decoding the encoded frames comprises decoding a low frequency frame associated with the low frequency wavelet information and a high frequency frame associated with the high frequency wavelet information into two decoded low frequency frames, and
wherein interpolating additional frames between the decoded frames comprises interpolating two or more low frequency frames based on the two decoded low frequency frames and linear motion trajectories representing motion between the two decoded low frequency frames.

16. A processor being configured to:
decode frames of the multimedia sequence, the frames being encoded via wavelet information according to a wavelet transform coding scheme; and
interpolate additional frames between the decoded frames based on the wavelet information;
wherein the wavelet information comprises low frequency wavelet information, high frequency wavelet information and motion information,
wherein the motion information comprises a plurality of motion fields, at least one of the motion fields being derived from another of the motion fields,
wherein the processor decodes the encoded frames by decoding a low frequency frame associated with the low frequency wavelet information and a high frequency frame associated with the high frequency wavelet information into two decoded low frequency frames, and
wherein the processor interpolates two or more low frequency frames based on the two decoded low frequency frames and linear motion trajectories representing motion between the two decoded low frequency frames.

17. An apparatus comprising:
means for receiving wavelet information associated with encoded frames of a multimedia sequence;
means for decoding the encoded frames of the multimedia sequence; and
means for interpolating additional frames between the decoded frames based on the wavelet information;
wherein the wavelet information comprises low frequency wavelet information, high frequency wavelet information and motion information,
wherein the motion information comprises a plurality of motion fields, at least one of the motion fields being derived from another of the motion fields,
wherein the means for decoding the encoded frames is configured to decode a low frequency frame associated with the low frequency wavelet information and a high frequency frame associated with the high frequency wavelet information into two decoded low frequency frames, and
wherein the means for interpolating additional frames between the decoded frames is configured to interpolate two or more low frequency frames based on the two decoded low frequency frames and linear motion trajectories representing motion between the two decoded low frequency frames.

* * * * *